United States Patent
Bhattad et al.

(10) Patent No.: US 9,054,842 B2
(45) Date of Patent: Jun. 9, 2015

(54) CRS (COMMON REFERENCE SIGNAL) AND CSI-RS (CHANNEL STATE INFORMATION REFERENCE SIGNAL) TRANSMISSION FOR REMOTE RADIO HEADS (RRHS)

(75) Inventors: Kapil Bhattad, Karnataka (IN); Wanshi Chen, San Diego, CA (US); Peter Gaal, San Diego, CA (US); Stefan Geirhofer, San Diego, CA (US); Tingfang Ji, San Diego, CA (US); Juan Montojo, Nuremberg (DE)

(73) Assignee: QUALCOMM INCORPORATED, San Diego, CA (US)

( * ) Notice: Subject to any disclaimer, the term of this patent is extended or adjusted under 35 U.S.C. 154(b) by 157 days.

(21) Appl. No.: 13/372,078

(22) Filed: Feb. 13, 2012

(65) Prior Publication Data

US 2013/0051240 A1   Feb. 28, 2013

Related U.S. Application Data

(60) Provisional application No. 61/442,725, filed on Feb. 14, 2011.

(51) Int. Cl.
| | | |
|---|---|---|
| *G01R 31/08* | (2006.01) | |
| *H04L 5/00* | (2006.01) | |
| *H04L 25/02* | (2006.01) | |
| *H04L 25/03* | (2006.01) | |
| *H04W 48/08* | (2009.01) | |
| *H04W 88/08* | (2009.01) | |

(52) U.S. Cl.
CPC .............. *H04L 5/005* (2013.01); *H04L 5/0023* (2013.01); *H04L 5/0032* (2013.01); *H04L 5/0051* (2013.01); *H04L 5/0057* (2013.01); *H04L 25/0204* (2013.01); *H04L 25/0224* (2013.01); *H04L 25/03866* (2013.01); *H04L 25/0391* (2013.01); *H04W 48/08* (2013.01); *H04W 88/085* (2013.01)

(58) Field of Classification Search
CPC .............. H04L 25/03343; H04L 2025/03426; H04L 2025/03802; H04L 25/0226; H04L 5/005; H04L 5/0051; H04L 1/0073; H04L 1/0606; H04L 2001/0093; H04L 5/0057; H04L 25/0204; H04L 25/0224; H04W 4/025; H04W 72/0406; H04W 24/10; H04W 48/08; H04B 7/0417
See application file for complete search history.

(56) References Cited

U.S. PATENT DOCUMENTS

| | | | |
|---|---|---|---|
| 6,549,787 | B1 | 4/2003 | Ravi |
| 8,576,792 | B2 | 11/2013 | Kim et al. |
| 8,599,711 | B2 | 12/2013 | Hugl et al. |

(Continued)

FOREIGN PATENT DOCUMENTS

| | | | |
|---|---|---|---|
| JP | 2010068496 | A | 3/2010 |
| JP | 2011004212 | A | 1/2011 |

(Continued)

OTHER PUBLICATIONS

LG, "LTE Advanced," Nov. 4, 2010, 181 pages.

(Continued)

*Primary Examiner* — David Oveissi
(74) *Attorney, Agent, or Firm* — Seyfarth Shaw LLP

(57) ABSTRACT

One aspect of the present disclosure provides various configurations of the macro cell and remote radio heads to allow legacy UEs to function, including mapping CRS ports to physical antenna, configuring CSI-RS transmissions and assisting the new UE in identifying remote radio heads.

18 Claims, 14 Drawing Sheets

(56) References Cited

U.S. PATENT DOCUMENTS

| | | | |
|---|---|---|---|
| 2005/0272472 A1* | 12/2005 | Goldberg et al. | 455/562.1 |
| 2006/0276227 A1 | 12/2006 | Dravida | |
| 2007/0167181 A1 | 7/2007 | Ramesh et al. | |
| 2008/0049791 A1* | 2/2008 | Tirkkonen et al. | 370/491 |
| 2008/0095036 A1 | 4/2008 | Gorokhov et al. | |
| 2009/0235176 A1 | 9/2009 | Jayanthi | |
| 2009/0247067 A1 | 10/2009 | Li et al. | |
| 2009/0253426 A1 | 10/2009 | Qiu et al. | |
| 2009/0296635 A1 | 12/2009 | Hui et al. | |
| 2010/0034175 A1 | 2/2010 | Xiao et al. | |
| 2010/0056215 A1 | 3/2010 | Gorokhov et al. | |
| 2010/0067592 A1 | 3/2010 | Goldhamer | |
| 2010/0067627 A1 | 3/2010 | Lincoln et al. | |
| 2010/0099428 A1 | 4/2010 | Bhushan et al. | |
| 2010/0111065 A1 | 5/2010 | Noh et al. | |
| 2010/0118989 A1* | 5/2010 | Sayana et al. | 375/260 |
| 2010/0177746 A1 | 7/2010 | Gorokhov et al. | |
| 2010/0195635 A1 | 8/2010 | Maeda | |
| 2010/0234037 A1 | 9/2010 | Terry et al. | |
| 2010/0238824 A1 | 9/2010 | Farajidana et al. | |
| 2010/0265874 A1 | 10/2010 | Palanki et al. | |
| 2010/0272032 A1 | 10/2010 | Sayana et al. | |
| 2010/0285810 A1 | 11/2010 | Ko et al. | |
| 2010/0290413 A1 | 11/2010 | Kuwahara | |
| 2010/0311349 A1 | 12/2010 | Koo et al. | |
| 2010/0311437 A1 | 12/2010 | Palanki et al. | |
| 2010/0317343 A1 | 12/2010 | Krishnamurthy et al. | |
| 2010/0322227 A1 | 12/2010 | Luo | |
| 2010/0323684 A1* | 12/2010 | Cai et al. | 455/422.1 |
| 2011/0026482 A1 | 2/2011 | Li et al. | |
| 2011/0044250 A1 | 2/2011 | Han et al. | |
| 2011/0075624 A1 | 3/2011 | Papasakellariou et al. | |
| 2011/0085610 A1 | 4/2011 | Zhuang et al. | |
| 2011/0103324 A1 | 5/2011 | Nam et al. | |
| 2011/0122968 A1 | 5/2011 | Jongren et al. | |
| 2011/0149894 A1 | 6/2011 | Luo et al. | |
| 2011/0151886 A1 | 6/2011 | Grayson et al. | |
| 2011/0170435 A1 | 7/2011 | Kim et al. | |
| 2011/0170496 A1* | 7/2011 | Fong et al. | 370/329 |
| 2011/0176440 A1 | 7/2011 | Frank et al. | |
| 2011/0176634 A1 | 7/2011 | Yoon et al. | |
| 2011/0183669 A1 | 7/2011 | Kazmi | |
| 2011/0188481 A1 | 8/2011 | Damnjanovic et al. | |
| 2011/0194536 A1* | 8/2011 | Kim et al. | 370/335 |
| 2011/0199986 A1 | 8/2011 | Fong et al. | |
| 2011/0244877 A1 | 10/2011 | Farajidana et al. | |
| 2011/0256861 A1 | 10/2011 | Yoo et al. | |
| 2011/0261673 A1 | 10/2011 | Luo et al. | |
| 2011/0268050 A1 | 11/2011 | Farajidana et al. | |
| 2011/0268077 A1 | 11/2011 | Wan et al. | |
| 2011/0274188 A1 | 11/2011 | Sayana et al. | |
| 2011/0275394 A1 | 11/2011 | Song et al. | |
| 2011/0317657 A1 | 12/2011 | Chmiel et al. | |
| 2011/0319025 A1* | 12/2011 | Siomina et al. | 455/63.1 |
| 2012/0057566 A1 | 3/2012 | Ahmadi | |
| 2012/0088458 A1 | 4/2012 | Nogami et al. | |
| 2012/0100844 A1 | 4/2012 | Baldemair et al. | |
| 2012/0176939 A1 | 7/2012 | Qu et al. | |
| 2012/0201163 A1 | 8/2012 | Joengren et al. | |
| 2012/0207043 A1 | 8/2012 | Geirhofer et al. | |
| 2012/0207105 A1 | 8/2012 | Geirhofer et al. | |
| 2012/0208541 A1 | 8/2012 | Luo et al. | |
| 2012/0208547 A1 | 8/2012 | Geirhofer et al. | |
| 2012/0213108 A1 | 8/2012 | Ji et al. | |
| 2012/0213261 A1 | 8/2012 | Sayana et al. | |
| 2012/0315859 A1 | 12/2012 | Lee et al. | |
| 2013/0033998 A1 | 2/2013 | Seo et al. | |
| 2013/0039203 A1 | 2/2013 | Fong et al. | |
| 2013/0250913 A1 | 9/2013 | Geirhofer et al. | |

FOREIGN PATENT DOCUMENTS

| | | |
|---|---|---|
| JP | 2012519998 A | 8/2012 |
| KR | 20070106391 A | 11/2007 |
| WO | 2010039066 A1 | 4/2010 |
| WO | 2010100077 A1 | 9/2010 |
| WO | 2010126711 A1 | 11/2010 |
| WO | 2010150898 A1 | 12/2010 |
| WO | 2011020062 A2 | 2/2011 |
| WO | 2011057037 A2 | 5/2011 |
| WO | 2011100672 A1 | 8/2011 |
| WO | 2012059139 A1 | 5/2012 |
| WO | 2013007207 A1 | 1/2013 |

OTHER PUBLICATIONS

International Search Report and Written Opinion—PCT/US2012/025013—ISA/EPO—Jul. 9, 2012.

Motorola: "Impact of HeNB interference on paging channel performance", 3GPP Draft; R4-092399, 3rd Generation Partnership Project (3GPP), Mobile Competence Centre ; 650, Route Des Lucioles ; F-06921 Sophia-Antipolis Cedex ; France, no. Los Angeles, CA; Jun. 25, 2009, XP050353633, [retrieved on Jun. 25, 2009].

NTT Docomo, "Throughput Performance Evaluation of RE Muting for Inter-cell CSI-RS",3GPP Draft; R1-105433 CSIRS PDSCH Muting Evaluation, 3rd Generation Partnership Project (3GPP), Mobile Competence Centre ; 650, Route Des Lucioles ; F-06921 Sophia-Antipolis Cedex ; France, vol. RAN WG1, no. Xi 'an; Oct. 11, 2010, Oct. 5, 2010, XP050450566, [retrieved on Oct. 5, 2010] p. 3, paragraph 2.

Pantech: "Considerations on signaling for POSCH muting in LTE-Advanced", 3GPP Draft; R1-105303, 3rd Generation Partnership Project (3GPP), Mobile Competence Centre ; 650, Route Des Lucioles ; F-06921 Sophia-Antipolis Cedex, France, vol. RAN WG1, no. Xi an, China; Oct. 2010,Oct. 14, 2010, XP050489302,[retrieved on Oct. 14, 2010] section 2.

Partial International Search Report—PCT/US2012/025013—ISA/EPO—May 4, 2012.

ZTE, "Interference coordination for control channels under non-CA based heterogeneous deployments", 3GPP Draft; R1-104566, 3rd Generation Partnership Project (3GPP), Mobile Competence Centre ; 650, Route Des Lucioles ; F-06921 Sophia-Antipolis Cedex; France, vol. RAN WG1, no. Madrid, Spain; Aug. 23, 2010, Aug. 17, 2010, XP050449863, [retrieved on Aug. 17, 2010] abstract; figure 4 section 1, 4.

Alcatel-Lucent et al., "Further Details of CoMP Scenarios for Evaluation, Especially Scenario 4", 3GPP TSG RAN WG1 #64, R1-110802, Feb. 15, 2011, pp. 1-8, Retrieved from URL: http://www.3gpp.org/ftp/tsg_ran/WG1_RL1/TSGR1_64/Docs/R1-110802.zip.

Catt: "Considerations on scenarios and simulation assumptions of CoMP," R1-110059, 3GPP, Jan. 17-21, 2011, pp. 1-5.

Huawei: CoMP clarification of definitions and TP, 3GPP TSG RAN WG1 Meeting #55, R1-084351, Prague, Czech Republic, Nov. 10-Nov. 14, 2008, pp. 1-5.

Motorola Mobility, "Discussion of RRH Deployment with Single Cell ID", 3GPP TSG-RAN WG1#64 R1-110869, Taiwan, Feb. 21, 2011.

Motorola Mobility: "Overview of Coordinated Multi-Point Operation for LTE", 3GPP TSG RAN1 #63bis, R1-110301, Jan. 2011, pp. 1-3, Retrieved from URL: http://www.3gpp.org/ftp/tsg_ran/WG1_RL1/TSGR1_63b/Docs/R1-110301.zip.

Qualcomm Europe: "Details of CSI-RS", 3GPP TSG-RAN WG1 #59, R1-094867, Nov. 9-13, 2009, Jeju, Korea, pp. 1-6.

Qualcomm Europe: "Impact of Downlink CoMP on the Air Interface" 3GPP Draft; R1-090366, 3rd Generation Partnership Project (3GPP), Mobile Competence Centre; 650, Route Des Lucioles; F-06921 Sophia-Antipolis Cedex; France, no. Ljubljana; 20090108, 3 Pages, XP050318270, Jan. 8, 2009.

Qualcomm Incorporated: "Signaling and Configuration of CSI-RS", 3GPP Draft; R1-104797 Signaling and Configuration of CSI-RS, 3rd Generation Partnership Project (3GPP), Mobile Competence Centre; 650, Route Deslucioles; F-06921 Sophia-Antipoliscedex; France, vol. RAN WG1, no. Madrid, Spain; Aug. 23, 2010, Aug. 17, 2010, XP050449989,[retrieved on Aug. 17, 2010)sections 4 and 5.

Samsung: "Details of CQI definition for LTE-A", 3GPP Draft; R1-106034, 3rd Generation Partnership Project (3GPP), Mobile

(56) References Cited

OTHER PUBLICATIONS

Competence Centre; 650, Route Des Lucioles; F-06921 Sophiaantipolis Cedex; France, vol. RAN WG1, no. Jacksonville, USA; Nov. 15, 2010, Nov. 9, 2010, XP050466815, [retrieved on Nov. 9, 2010] section 1 Introduction section 3 CQI definition for Rel-10 section 7.2.3 Channel quality indicator (CQI) definition.

Samsung: "DL RS Designs for LTE-Advanced," R1-091231, 3GPP, Mar. 23-27, 2009, pp. 1-5.

Translation of First Office Action from counterpart Japanese Application No. 2013-553428, dated Sep. 16, 2014, 5 pages.

Translation of First Office Action from counterpart Japanese Application No. 2013-553446, dated Jul. 1, 2014, 3 pages.

Translation of First Office Action from counterpart Japanese Application No. 2013-553457, dated Sep. 2, 2014, 6 pages.

ZTE: "Enhanced Transmit Diversity Schemes for LTE-A Downlink," R1-091708, 3GPP, May 4-8, 2009, pp. 1-18.

ZTE: "Remaining Issues of CSI Feedback", 3GPP Draft; R1-110174, 3rd Generation Partnership Project (3GPP), Mobile Competence Centre; 650, Route Des Lucioles; F-06921 Sophiaantipolis Cedex; France, vol. RAN WG1, no. Dublin, Ireland; Jan. 17, 2011, Jan. 13, 2011, XP050490359, [retrieved on Jan. 13, 2011].

* cited by examiner

RRH Mapping
CRS port 0,1 both transmitted by RRH Antenna 0
CRS port 2,3 both transmitted by RRH Antenna 1
RRH Mapping
CRS port 0,3 are transmitted by RRH Antenna 0
CRS port 1,2 are transmitted by RRH Antenna 1
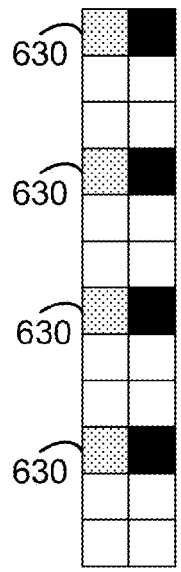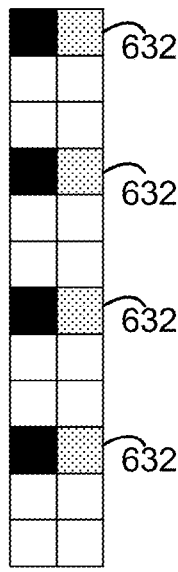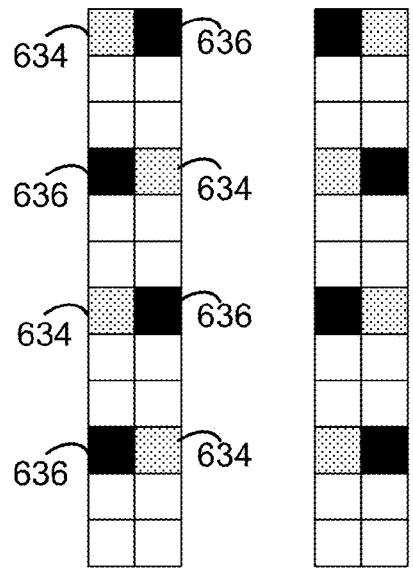
FIG. 6C
FIG. 6D

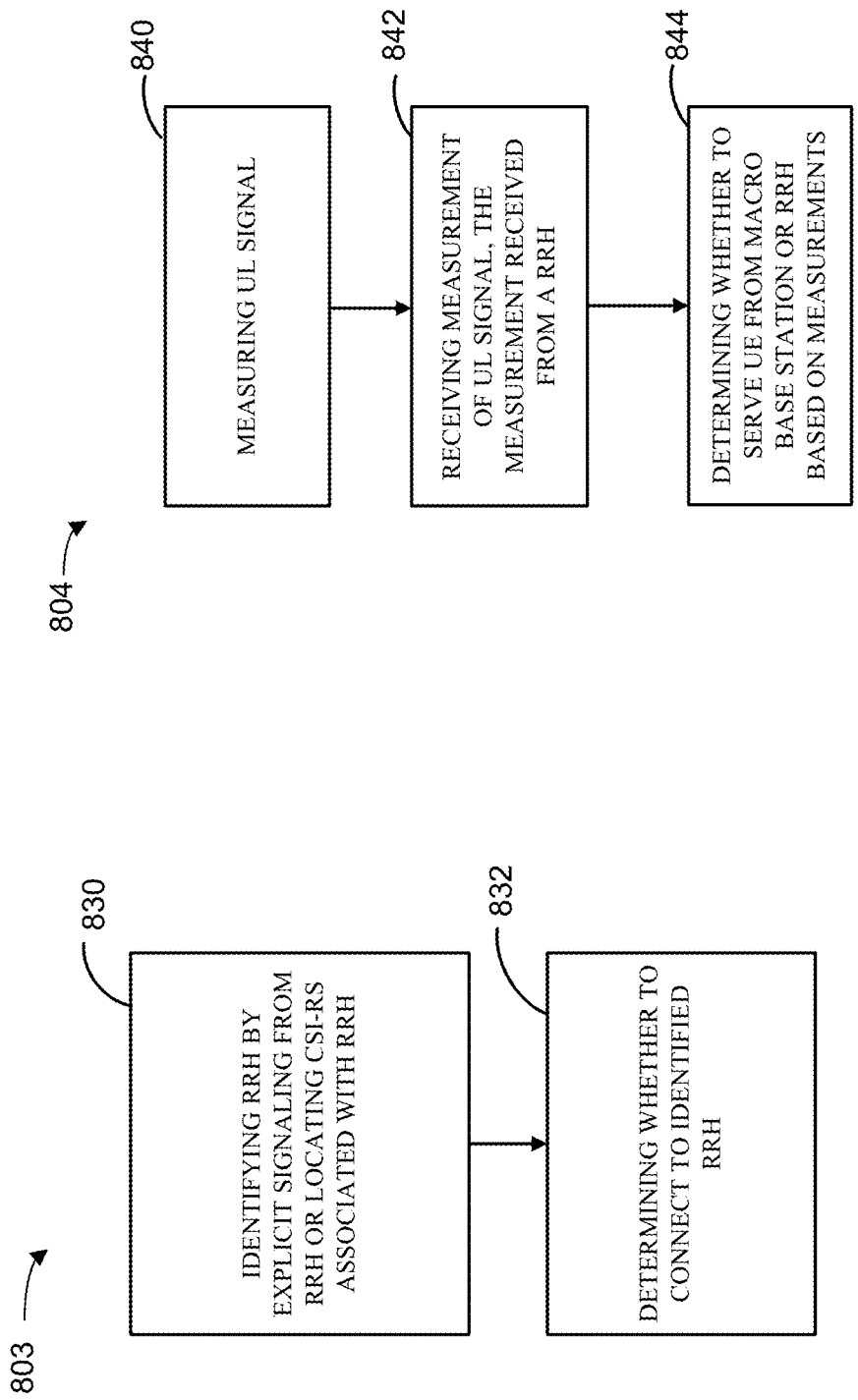

CRS (COMMON REFERENCE SIGNAL) AND CSI-RS (CHANNEL STATE INFORMATION REFERENCE SIGNAL) TRANSMISSION FOR REMOTE RADIO HEADS (RRHS)

CROSS-REFERENCE TO RELATED APPLICATION

This application claims the benefit under 35 U.S.C. §119(e) to U.S. Provisional Patent Application No. 61/442,725 entitled "CRS (COMMON REFERENCE SIGNAL) AND CSI-RS (CHANNEL STATE INFORMATION REFERENCE SIGNAL) TRANSMISSION FOR REMOTE RADIO HEADS (RRHs)," filed on Feb. 14, 2011, the disclosure of which is expressly incorporated by reference herein in its entirety.

BACKGROUND

1. Field

Aspects of the present disclosure relate generally to wireless communication systems, and more particularly to transmitting reference signals for networks including remote radio heads.

2. Background

Wireless communication networks are widely deployed to provide various communication services such as voice, video, packet data, messaging, broadcast, etc. These wireless networks may be multiple-access networks capable of supporting multiple users by sharing the available network resources. A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect, a method of wireless communication is disclosed. The method includes selecting a common reference signal (CRS) virtualization scheme to match a number of common reference signal (CRS) antenna ports at a remote radio head (RRH) and a number of CRS antenna ports at a macro eNodeB. The selected CRS is then transmitted using the virtualization scheme.

Another aspect discloses a method of wireless communication and includes selecting a channel state information reference signal (CSI-RS) configuration to create CSI-RS ports at a macro eNodeB and at a plurality of remote radio heads (RRHs). CSI-RS is then transmitted in accordance with the selected CSI-RS configuration.

In another aspect, a method of wireless communication is disclosed. The method includes identifying a remote radio head (RRH) by explicit signaling from the RRH or by locating channel state information reference signals (CSI-RSs) associated with the RRH. Then it is determined whether to connect to the identified RRH.

Another method of wireless communication is disclosed and includes measuring an uplink signal. Next, a measurement is received, from a remote radio head, of the uplink signal. The macro eNodeB determines whether to serve a UE from the base station (macro eNodeB) or from the RRH based on the measurements.

One aspect discloses wireless communication having a memory and at least one processor coupled to the memory. The processor(s) is configured to select a common reference signal (CRS) virtualization scheme to match a number of common reference signal (CRS) antenna ports at a remote radio head (RRH) and a number of CRS antenna ports at a macro eNodeB. The processor is also configured to transmit the CRS using the virtualization scheme.

In another aspect, wireless communication having a memory and at least one processor coupled to the memory is disclosed. The processor(s) is configured to select a channel state information reference signal (CSI-RS) configuration to create CSI-RS ports at a macro eNodeB and at a plurality of remote radio heads (RRHs). The processor(s) is also configured to transmit CSI-RS in accordance with the selected CSI-RS configuration.

Another aspect discloses wireless communication having a memory and at least one processor coupled to the memory. The processor(s) is configured to identify a remote radio head (RRH) by explicit signaling from the RRH or locating channel state information reference signals (CSI-RSs) associated with the RRH. The processor(s) is also configured to determine whether to connect to the identified RRH.

In another aspect, wireless communication having a memory and at least one processor coupled to the memory is disclosed. The processor(s) is configured to measure an uplink signal and to receive a measurement of the uplink signal. The received measurement is from a remote radio head (RRH). The processor(s) then determine whether to ser serve the UE from the macro base station or the RRH based on the measurements.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of to selecting a common reference signal (CRS) virtualization scheme to match a number of common reference signal (CRS) antenna ports at a remote radio head (RRH) and a number of CRS antenna ports at a macro eNodeB. The program code also causes the processor(s) to transmit the CRS using the virtualization scheme.

Another aspect discloses a computer program product for wireless communications in a wireless network having a non-transitory computer-readable medium. The computer readable medium has non-transitory program code recorded thereon which, when executed by the processor(s), causes the processor(s) to perform operations of selecting a channel state information reference signal (CSI-RS) configuration to create CSI-RS ports at a macro eNodeB and at a plurality of remote radio heads (RRHs). The program code also causes the processor(s) to transmit CSI-RS in accordance with the selected CSI-RS configuration.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of identifying a remote radio head (RRH) by explicit signaling from the RRH or locating channel state information reference signals (CSI-RSs) associated with the RRH. The program code also causes the processor(s) to determine whether to connect to the identified RRH.

Another aspect discloses a computer program product for wireless communications in a wireless network having a non-transitory computer-readable medium. The computer readable medium has non-transitory program code recorded thereon which, when executed by the processor(s), causes the processor(s) to perform operations of measuring an uplink signal. The program code also causes the processor(s) to receive a measurement of the uplink signal where the measurement is received from a remote radio head (RRH). The program code also causes the processor(s) to determine whether to serve a UE from a macro base station or RRH based on the measurements.

One aspect discloses an apparatus for wireless communication and includes means for selecting a common reference signal (CRS) virtualization scheme to match a number of common reference signal (CRS) antenna ports at a remote radio head (RRH) and a number of CRS antenna ports at a macro eNodeB. The apparatus also includes means for transmitting the CRS using the virtualization scheme.

In another aspect, an apparatus for wireless communication is disclosed. The apparatus includes means for selecting a channel state information reference signal (CSI-RS) configuration to create CSI-RS ports at a macro eNodeB and at a plurality of remote radio heads (RRHs). The apparatus also includes means for transmitting CSI-RS in accordance with the selected CSI-RS configuration.

Another aspect discloses an apparatus for wireless communication. The apparatus includes means for identifying a remote radio head (RRH) by explicit signaling from the RRH or locating channel state information reference signals (CSI-RSs) associated with the RRH. The apparatus also includes means for determining whether to connect to the identified RRH.

In another aspect, an apparatus for wireless communication is disclosed and includes means for measuring an uplink signal. Also included is means for receiving a measurement of the uplink signal, the measurement being received from a remote radio head (RRH). The apparatus also includes means for determining whether to serve the UE from a macro base station or from the RRH based on the measurements.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 6A-6D illustrate CRS transmissions,

FIGS. 8C-8D are block diagrams illustrating methods for configuring remote radio heads.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA) and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
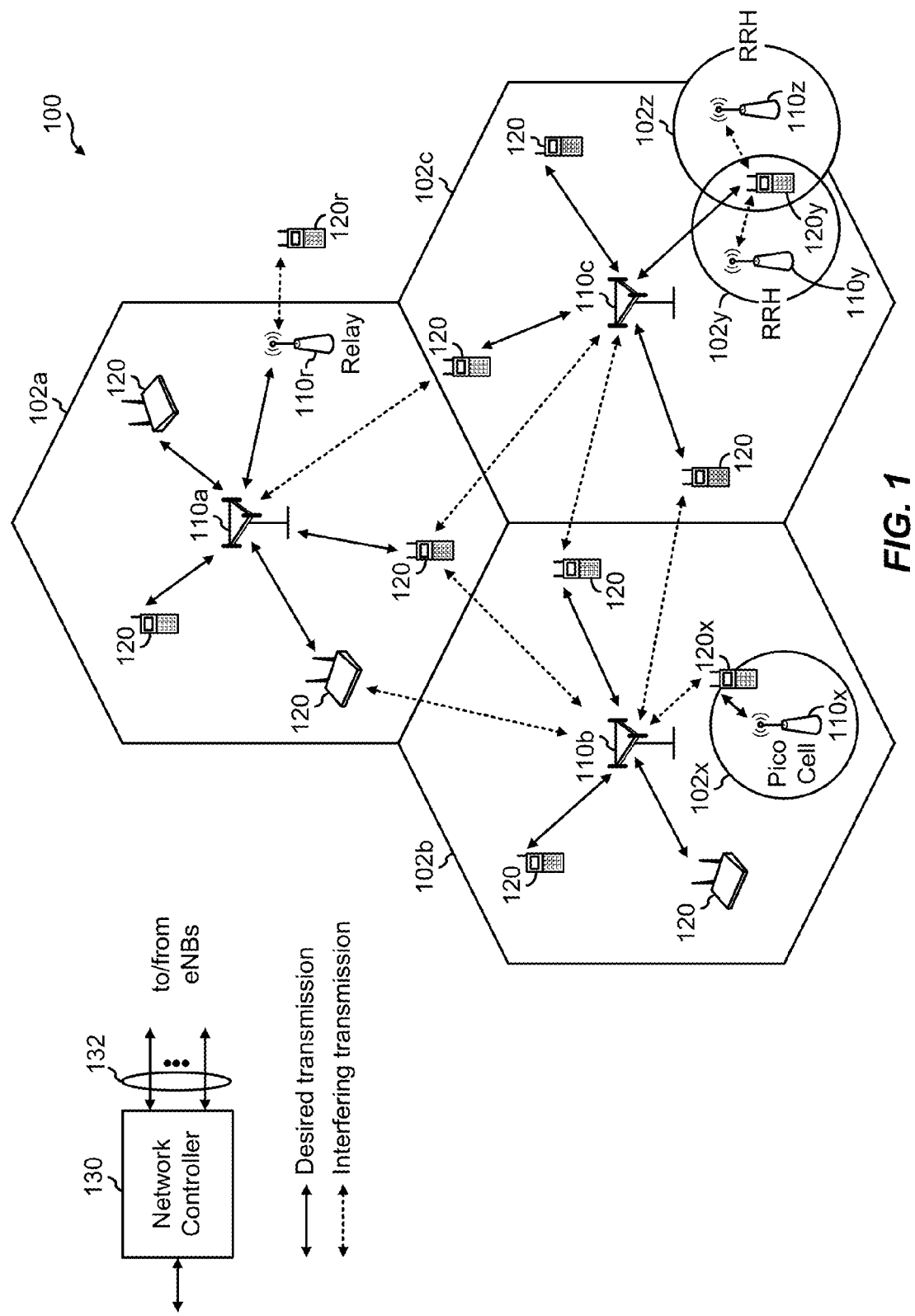
FIG. 1 is a block diagram conceptually illustrating an example of a telecommunications system.

FIG. 1 shows a wireless communication network 100, which may be an LTE-A network, with configurable remote radio heads. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell (sometimes referred to as a remote radio head (RRH)), a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). The RRHs are connected to the macro cell with a high speed connection, such as fiber, enabling fast communications and coordination between the macro cell and RRH as well as allowing for reliable configurations of the transmissions.

An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. And, an eNodeB for a RRH may be referred to as an RRH eNodeB, or simply as an RRH. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. The eNodeB 110x is a pico eNodeB for a pico cell 102x. The eNodeBs 110y and 110z are RRH eNodeBs for the cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support the operation of synchronous macro cells and remote radio heads (RRHs). Further, the wireless network 100 may support synchronous or asynchronous operation of surrounding macro base stations. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 (e.g., UE 120x, UE 120y, etc.) are dispersed throughout the wireless network 100, and each UE may be stationary or mobile. A UE may also be referred to as a terminal, a user terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a netbook, a smart book, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
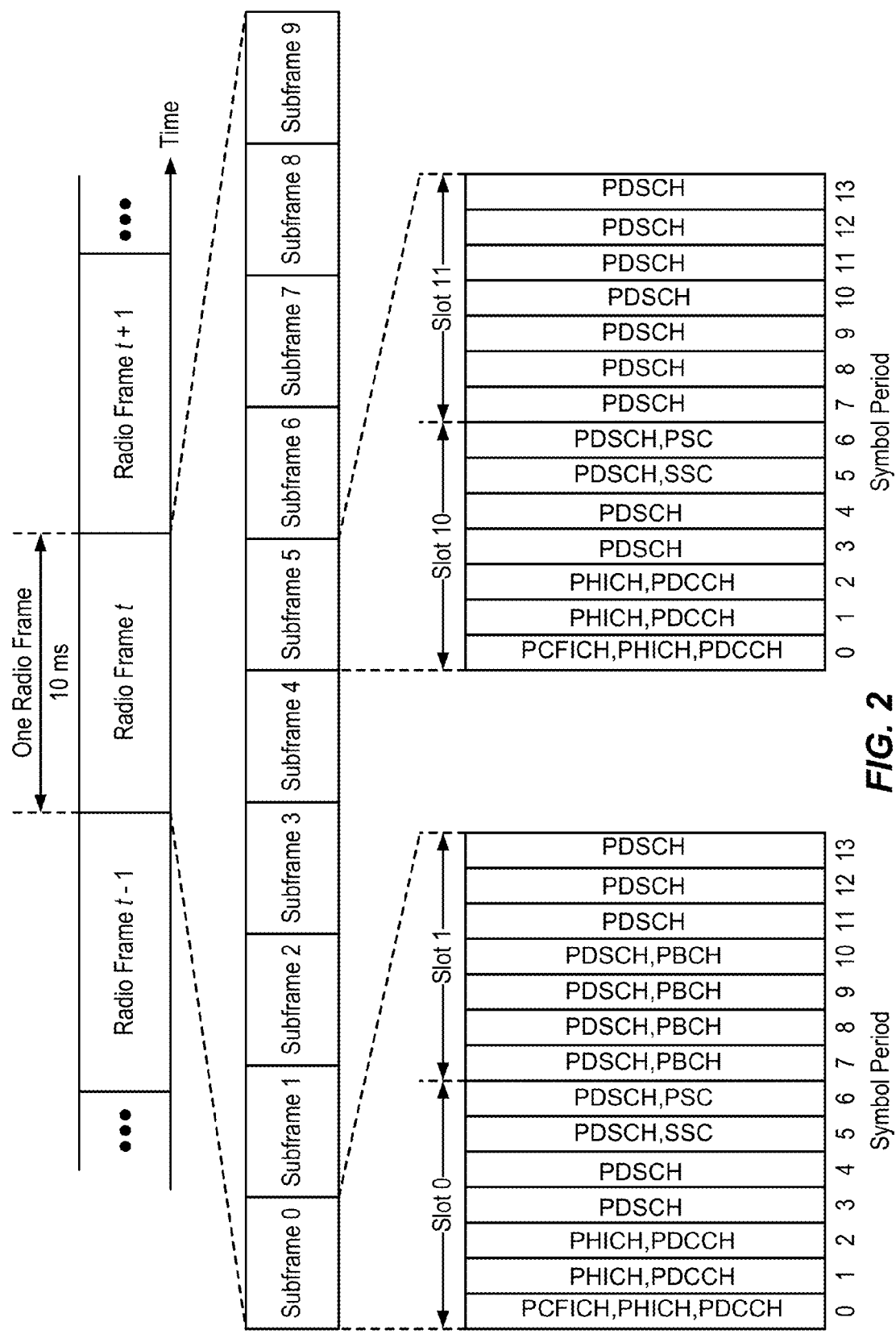
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic repeat request (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
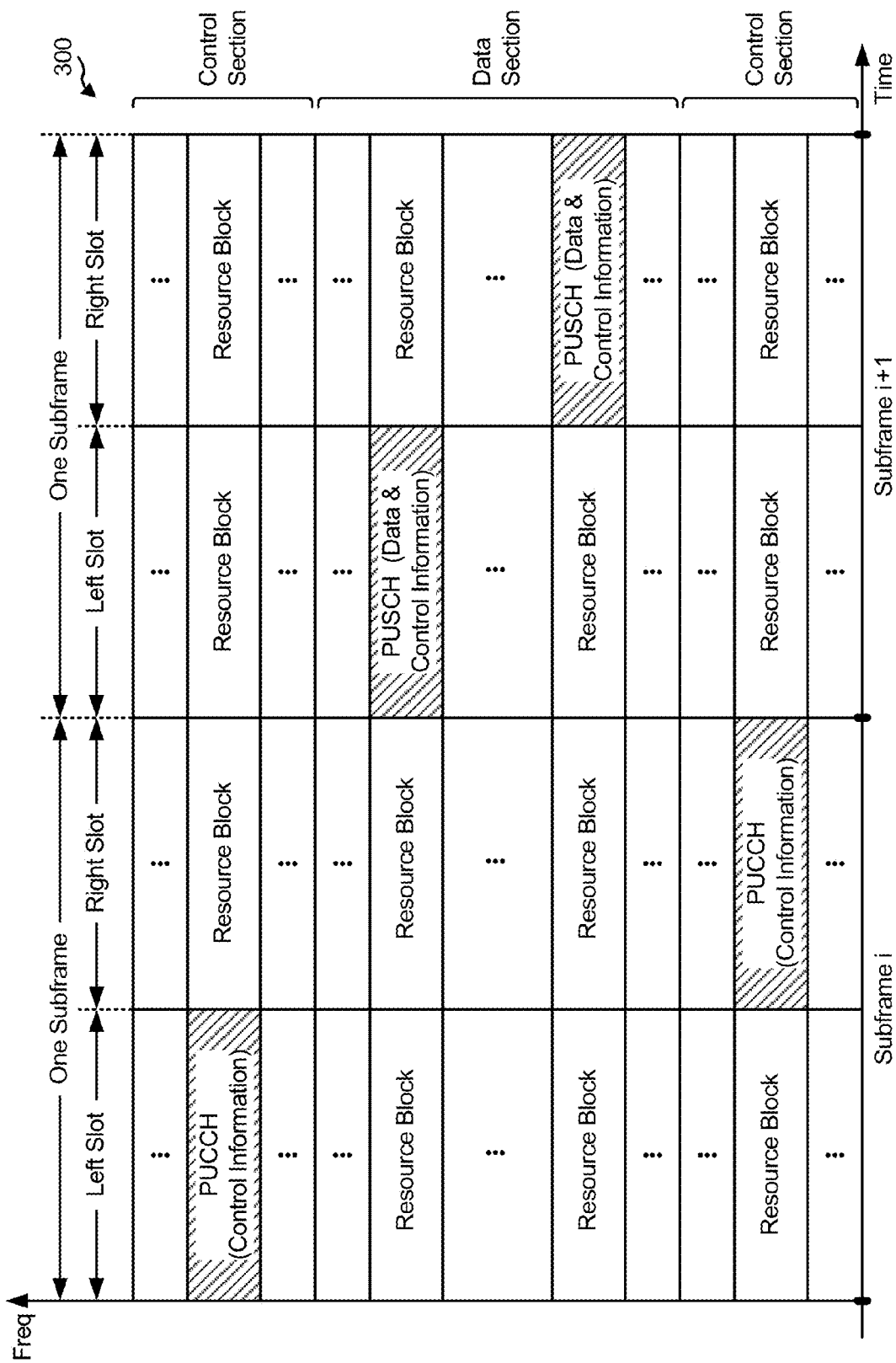
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC (primary synchronization carrier), SSC (secondary synchronization carrier), CRS (common reference signal), PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
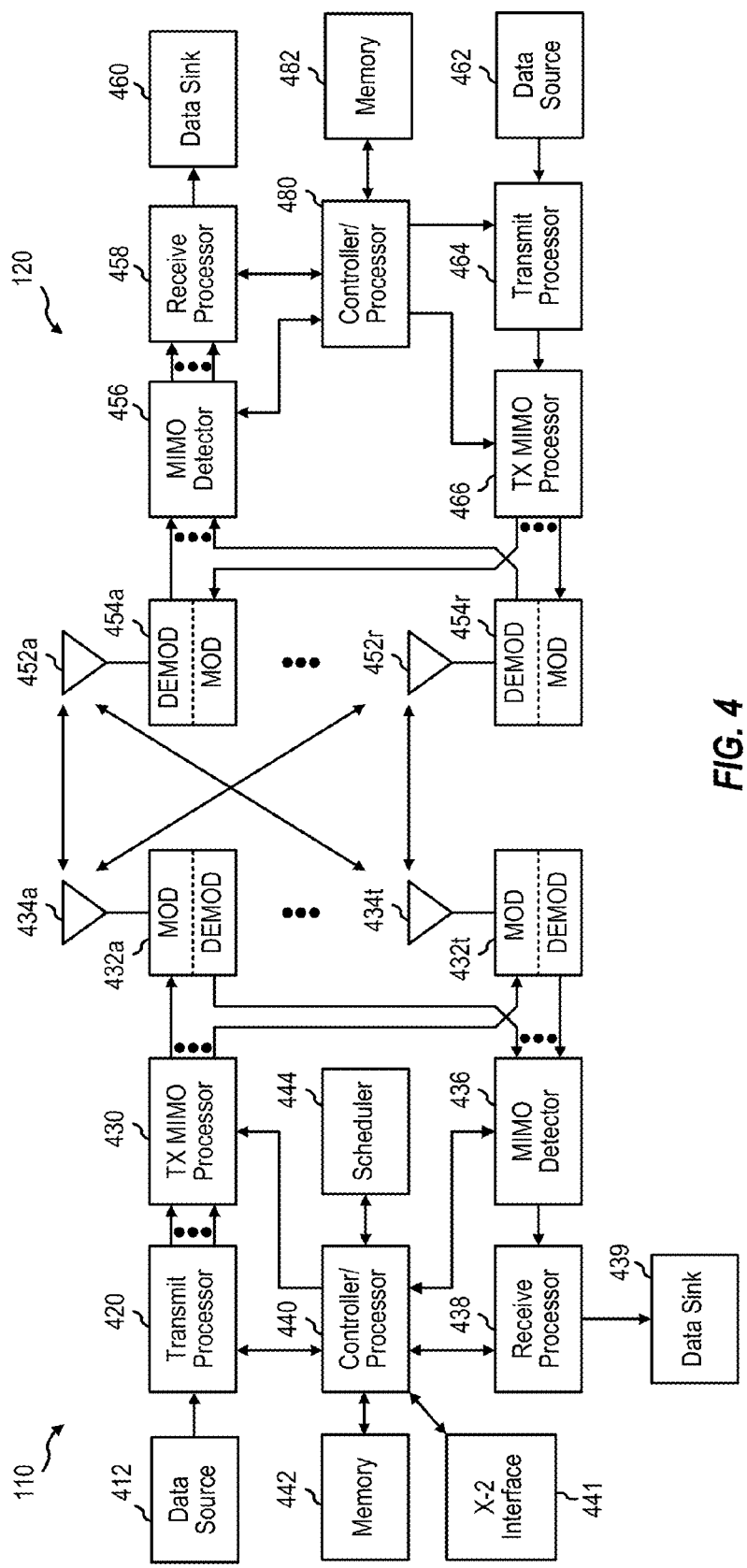
FIG. 4 is a block diagram conceptually illustrating a design of a base station/eNodeB and a UE configured according to an aspect of the present disclosure.

FIG. 4 shows a block diagram of a design of a base station/eNodeB 110 and a UE 120, which may be one of the base stations/eNodeBs and one of the UEs in FIG. 1. For example, the base station 110 may be the macro eNodeB 110c in FIG. 1, and the UE 120 may be the UE 120y. The base station 110 may also be a base station of some other type, such as a pico eNodeB 110x or remote radio head (RRH) 110y, 110z. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440/480 and/or other processors and modules at the base station 110/UE 120 may perform or direct the execution of the functional blocks illustrated in method flow chart FIGS. 8A-D, and/or other processes for the techniques described herein. The memories 442 and 482 may store data and program codes for the base station 110 and the UE 120, respectively. A scheduler 444 may schedule UEs for data transmission on the downlink and/or uplink.

RRH (Remote Radio Head) Configurations

In one aspect of the present disclosure, a network 100 includes a high powered base station (i.e., an eNodeB) connected to several smaller base stations (i.e., remote radio heads). The remote radio heads may be configured to serve primarily as antenna where the processing functions are performed by the eNodeB (the base station for the macro cell). Together, the group of remote radio heads form a large cell. The network 100 also includes new UEs and legacy UEs (e.g., 3GPP Release 8 UEs). The legacy UEs cannot distinguish between the macro cell and the cell formed by the combined remote radio heads. One aspect of the present disclosure provides various configurations of the macro cell and remote radio heads to allow the legacy UEs to function, including mapping CRS ports to physical antenna, configuring CSI-RS transmissions and assisting the new UE in identifying remote radio heads.

CRS Transmissions

One aspect of the present disclosure is directed to common reference signal (CRS) transmissions. In particular, in a wireless network, legacy UEs decode data based on channel estimates obtained from common reference signal (CRS) transmissions. A particular number of CRS ports are advertised to the UE. The CRS ports may be formed using antenna at the macro eNodeB only, antenna at the RRH only, or may include antenna at both the macro eNodeB and the RRH. A virtualization scheme defines how the antenna are mapped to the CRS ports.

One aspect of the present disclosure is directed to various configurations for this virtualization scheme, i.e., mapping antenna to CRS ports. In one aspect of the present disclosure, the number of CRS ports is the same for the macro cell and the remote radio heads. In another aspect, a virtualization scheme is configured such that the mapping of antenna to CRS ports is linearly independent. When the number of antenna is less than the number of CRS ports, the mapping may be chosen to optimize performance of transmit diversity schemes (SFBC, SFBC-FSTD). Data transmissions that use CRS based channel estimates to be decoded are sent using the same virtualization scheme as the CRS.

In one example, in LTE Release 8, a given cell (having both a macro eNodeB and associated RRHs) may advertise up to 4 CRS ports (e.g., 1, 2 or 4 antenna). The base station may advertise, to a UE, a fixed number (N) of CRS ports (e.g., N=1, 2 or 4) for a given cell. The cell includes a macro eNodeB and the associated RRHs that share the same cell ID. The transmitted reference signals are a function of the cell ID. Additionally, the reference signals are transmitted corresponding to the number (N) of CRS ports from the antenna that comprise the CRS port. The CRS port may be obtained using a single antenna or multiple antennas using antenna virtualization. Virtual antennas may be created, for example, by a linear combination of multiple antennas using a fixed precoding vector and may also be created in other manners such as by using cyclic delay diversity.

In another example, the CRS ports may be formed using antennas at both macro eNodeBs and one or more RRHs. For example, if a macro eNodeB and RRH have two antennas each and the UE is advertising two (2) CRS ports, then the first antenna at the macro eNodeB and at the RRH may be used to create the first CRS port. Additionally, the second antenna at the macro eNodeB and the RRH may be used to create the second CRS port. In the previous example, there are four antennas (e.g., two at the macro eNodeB and two at the RRH). The overall precoding vector is [1 0 1 0] and [0 1 0 1]. The precoding vectors used for CRS at the macro eNodeB are [1 0], [0 1]. The precoding vector used at the RRH to create CRS in this case are also [1 0], [0 1]. If the number of CRS ports is the same as the number of antenna, then one-to-one mapping may be applied. When the number of antenna is different from the number of CRS ports, then a virtual mapping is applied.

In another example, the CRS ports of the macro eNodeB and the RRH are complementary and the base stations each have one antenna (e.g., one physical antenna). In this example, the macro eNodeB may use CRS port 0 and the RRHs may use CRS port 1. The UEs that receive relatively strong signals from both the macro eNodeB and RRH experience a good channel on both of the CRS ports and may benefit from transmit diversity gains in control channels like PDCCH, etc. Additionally, the UEs may also obtain multiple input multiple output (MIMO) gains in the CRS based data transmission. The UEs that receive a signal from only the macro eNodeB or only the RRH are not expected to be significantly impacted apart from the higher reference signal overhead and possible performance impact due to significant difference in power in the two CRS ports.

In another example, the UEs are signaled the power level of each CRS port. In particular, the CRS power level of different ports may vary due to CRS virtualization, which may impact the UE performance. For example, the RRH port may have a significantly lower signal level than the macro eNodeB port, in which case the UE is informed of such power difference so the UE can reduce any impact the difference may have on performance. In one example, new UEs are signaled about this power level.

In one aspect, when the virtualization schemes are configured, each of the CRS ports are configured as independent combinations of the antenna.

In one example, the set of overall precoding vectors to create the virtual antennas are orthogonal. However, those skilled in the art will appreciate that any combination may be used, including non-orthogonal solutions. In one example, the CRS precoding vectors at the RRH alone and CRS precoding vector at the macro eNodeB alone are orthogonal. The UEs close to the macro eNodeB alone and UE close to the RRH alone see independent CRSs, which may provide better performance.

An orthogonal solution may not be always possible if the number of ports is greater than the number of antennas. For example, the RRH may have only two antennas, and four CRS ports are advertised to the UE. In the previous example, a virtual antenna may be created for the RRH by using the first antenna for ports 0 and 3 and the second antenna for ports 1 and 2. When independent mapping is not possible, an antenna mapping scheme that improves/optimizes space frequency block coding (SFBC) may be applied.

Figure 5A:
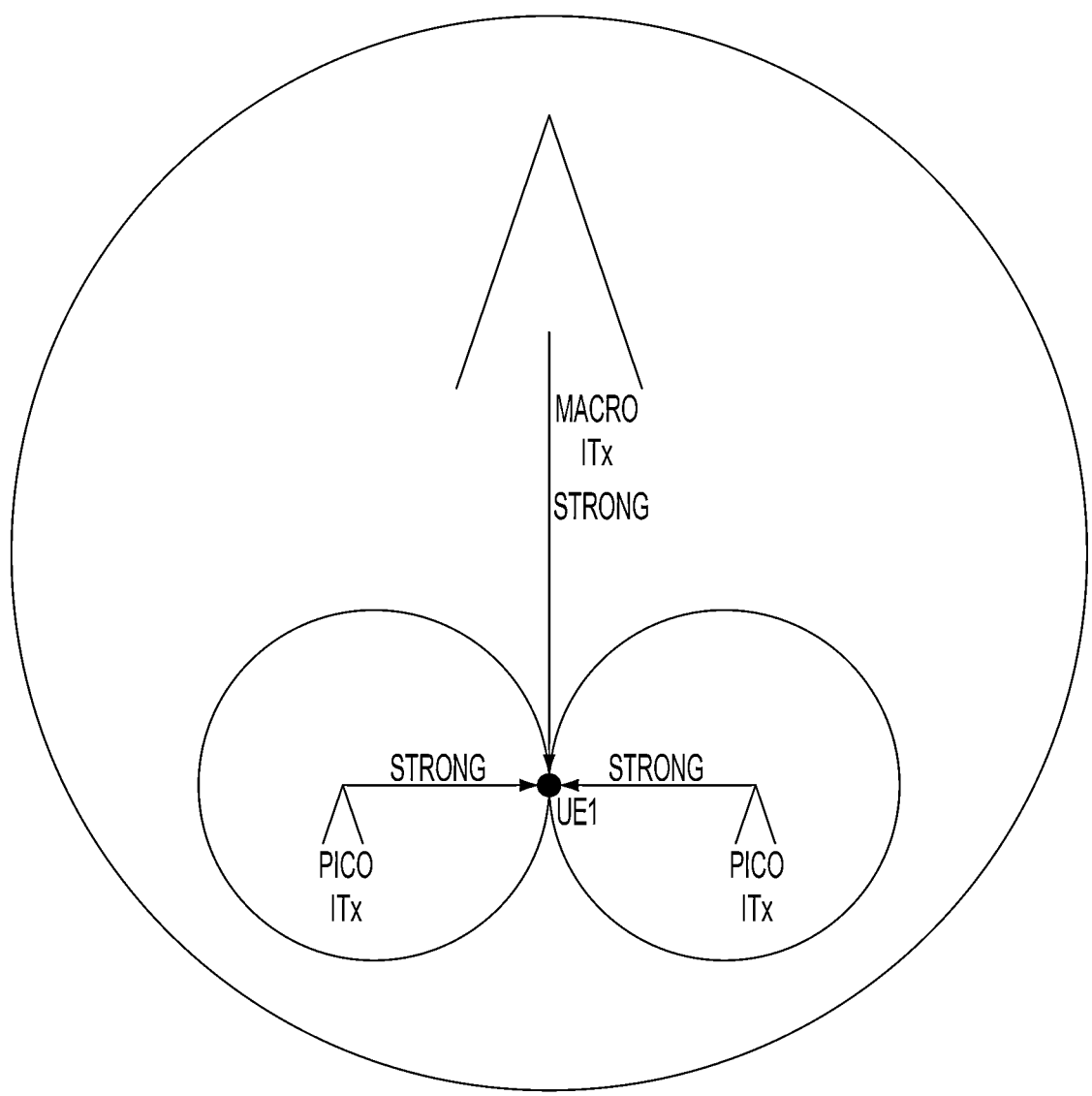
FIGS. 5A-5B illustrate CRS based data transmissions.

Some transmissions depend on channel estimates from the CRS to be decoded. In one example, these channel estimates are performed based on all of the transmission points sharing the same cell identification and creating the CRS ports. For data decoding, the channel estimate corresponding to the transmission points that will actually be transmitting data is used. To achieve this goal, the data that uses channel estimates from CRS is sent using the same CRS ports, that is, using the same virtualization scheme (same beam, same T2P, etc.) across all antennas of RRHs and macros that are used to create and send the CRS. In one example, these transmission points use the same beams and T2P (power level) to create the CRS port, as well as the same time and frequency resources. For example, as seen in FIG. 5A, if a macro cell (also referred to as macro eNodeB) is transmitting a particular signal "x" using the CRS port "p" on a particular set of time frequency resources (as well as T2P and beam), then all of the RRHs (only two shown in the figure) that transmit CRS on port "p" also transmit signal "x" in the same time frequency resource (as well as T2P and beam they used to create port "p"). This ensures matching of the data transmission and channel estimate from the CRS.

Figure 5B:
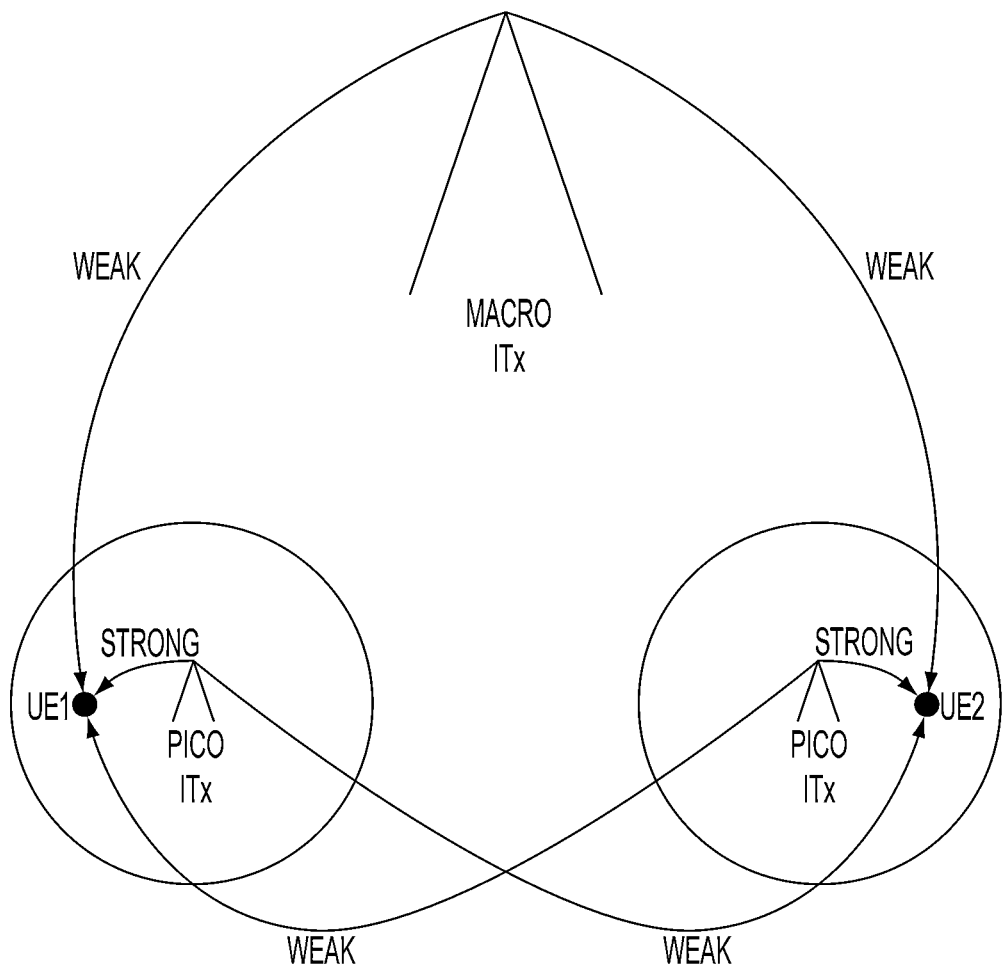

In another example shown in FIG. 5B, this condition may be relaxed. The CRS based transmissions may be possible in parallel for UEs that are close to different transmission points and see very weak channel conditions from other transmission points. For example, if a UE is close to a particular transmission point, the CRS based data transmission may be from only that one transmission point. The channel estimate from the CRS for that UE may include components from multiple transmission points. Decoding may be reliable if the component of the CRS from other transmission points is small. In another example, data may be transmitted from multiple transmission points but not all transmission points comprise the CRS port.

Figure 6A:
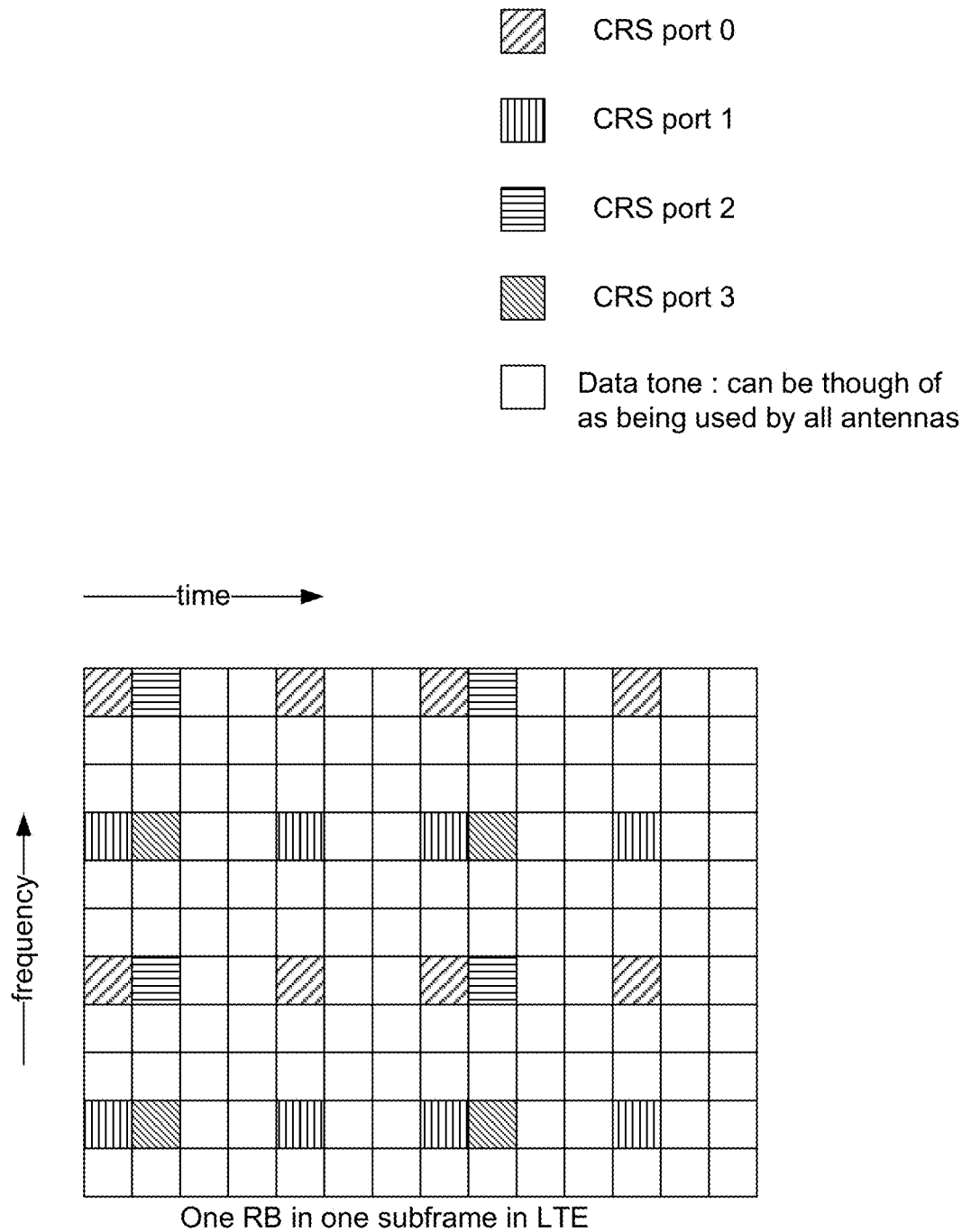

One example is directed to special considerations for four CRS ports. FIG. 6A illustrates an example of CRS patterns for one resource block. In particular, the CRS transmission for CRS ports 0 and 1 are defined to be transmitted on the same OFDM symbol. Additionally, the CRS transmission for CRS ports 2 and 3 are transmitted on the same OFDM symbol (different from OFDM symbols containing CRS ports 0 and 1). In one example, in a four antenna system, antenna 1 is mapped to port 0, antenna 2 is mapped to port 1, etc.

Figure 6B:
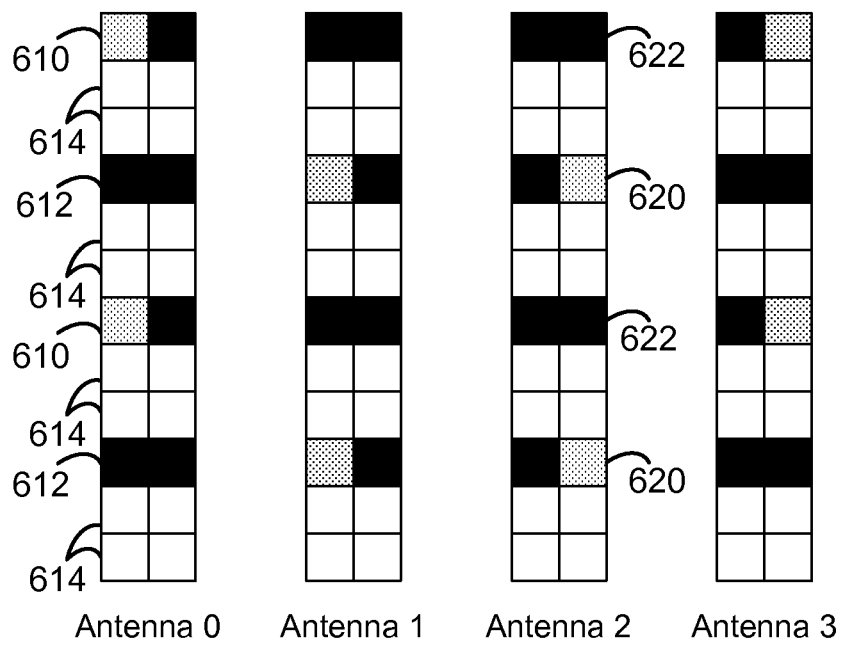

As seen in FIGS. 6B-D, the antenna virtualization may be configured to obtain improved power boost of the CRS. In particular, referring to FIG. 6B, the mapping of the tones (rows) of the first two symbols (columns) is illustrated. The symbol transmitted from antenna 0 are transmitting the CRS from locations/tones 610. Antenna 0 is not transmitting at locations 612 and is transmitting data at locations 614. In this example, each antenna has a power "P," and a power P is transmitted at each location 614. Because antenna 0 is not transmitting at locations 612, antenna 0 can boost the power of the CRS transmissions at locations 610. For example, the antenna 0 can transmit "2P" (or 2 times the power) at locations 610. Power may be boosted in a similar fashion at each antenna. For example, at antenna 2, because no power is used for transmitting at locations 622, the power may be boosted for the CRS transmitted at locations 620. In particular, a power of "2P" may be transmitted at locations 620 on antenna 2.

In another example, each RRH has two antennas and four CRS ports are advertised. Each antenna can be used for two CRS ports.

Referring to FIG. 6C, antenna 0 can be used for CRS port 0 and CRS port 1 at locations 630. Antenna 1 is used for CRS port 2 and CRS port 3 at location 632. Because antenna 0 is using all tones in the first symbol (to transmit CRS) the power cannot be boosted. The same applies for antenna 1. That is, because all tones are used at location 632, the power cannot be boosted.

Alternately, as illustrated in FIG. 6D, antenna 0 transmits both CRS port 0 and CRS port 3 in the first two symbols.

Antenna 1 transmits both CRS port 1 and CRS port 2 in the first two symbols. In this configuration power boosting may be applied. In particular, because antenna 0 transmits CRS in locations 634 (port 0 in the first symbol and port 3 in the second symbol) and transmits nothing in locations 636, then the CRS transmissions may be boosted. For example, the antenna 0 may transmit "2P" power at locations 634.

Additionally, the virtualization scheme may be configured to improve SFBC-FSTD (space frequency block code-frequency switched time domain) performance. SFBC-FSTD in LTE consists of two SFBC pairs, where the first pair uses CRS ports 0 and 2 and the second pair uses CRS ports 1 and 3. In one example, to increase the diversity gain obtained, antenna 0 and 2 are configured independently and antenna 1 and 3 are configured independently. For example, if two antennas are present at the RRH and four CRS ports are advertised, antenna 0 may be used for both CRS port 0 and CRS port 2, but may not yield full transmit diversity for that SFBC pair. On the other hand using the mapping in the previous example would likely increase/maximize the diversity.

CSI-RS Transmissions

Another aspect of the present disclosure is directed to configuring the CSI-RS transmissions for a network having macro eNodeB(s) and remote radio heads (RRHs). The UEs determine whether a signal is transmitted from a macro base station (e.g., eNodeB) or from a remote radio head(s). In one configuration, the UE uses CSI-RS to identify the existence of multiple cells such as one or more RRH in addition to the macro cell.

When employing CSI-RS transmissions, a macro cell transmits CSI-RS to a first location and RRHs transmit CSI-RS to a second location, different from the first location. When the macro cell and RRHs are transmitting CSI-RS they cannot transmit using CRS based data on those locations as CRS based data employs transmission from all the macro cells and RRHs used to form the CRS ports. Transmitting of CSI-RS and CRS by the same cell on the same resource is not possible.

The macro eNodeB and the RRHs may create the same number or a different number of CSI-RS ports. The CSI-RS ports that are created may be less than or more than the number of antennas available at that transmission point. If the created CSI-RS ports are less than the number of antennas available, then independent combinations of antennas are desirable. If more CSI-RS ports are created than antennas available, the CSI-RS antenna ports may not be independent. For example, the same antenna may be used for multiple CSI-RS ports.

In one example, to enable range expansion at the RRH, the CSI-RS ports of the macro eNodeB and the RRH are configured to be located on orthogonal resources (such as different sets of resource elements). This enables the UE to distinguish the CSI-RS from the macro eNodeB and from the RRH.

For UEs connected and/or associated with the RRH, the CSI-RS ports of the RRH are indicated as the CSI-RS ports for the cell. Thus, a channel estimate only accounts for the indicated RRH. For other UEs, such as legacy UEs, the CSI-RS ports of the macro eNodeB (also simply referred to as "macro") may be indicated as the CSI-RS ports of the cell. The macro may also mute the CSI-RS locations of the RRHs to enable better penetration of RRH CSI-RS, for example to enable range expansion.

In other applications, such as joint transmission in CoMP (coordinated multi-point) configurations, the CSI-RS transmissions from the RRH and the macro eNodeB may be configured on different orthogonal resources but may advertise both the CSI-RS ports of the macro eNodeB and RRH as CSI-RS ports of the same cell. Thus, the channel estimate from the CSI-RS ports will coincide with the actual data transmission points. For example, if the RRH has two antennas and two ports and the macro cell has two antennas and two ports, then the CSI-RS of the macro cell and RRH may transmit on orthogonal resources and advertise to the UE as four ports.

The power levels of different antenna ports may vary. In LTE Release 11, the UE may be informed of the power level of CSI-RS of different antenna ports and also power boost of CSI-RS due to muting etc. In one example, new signaling is configured to include more CSI-RS patterns than those advertised to legacy UEs and may include cases with more than eight antennas, for example when two RRHs and one macro eNodeB are in use and each have four CSI-RS ports.

If the pico and macro ports are in contiguous tones, some leakage may occur due to the frequency offset between the macro/pico and or the UE. The leakage may impact estimation performance due to the power level differences of different CSI-RS ports. In one example, different scrambling sequences are configured for different ports to reduce the impact of timing and frequency offsets.

In another example, CSI-RS ports of the macro cell and the RRH may be combined. For example, the CSI-RS for one antenna may be composed of antennas from the macro eNodeB and antenna from the RRH to create a stronger virtual CSI-RS antenna port.

In summary, CSI-RS ports may be configured from the macro eNodeB antennas only, from the RRH antennas only, or from a combination of antennas from the macro eNodeB and the RRH. The UE may be advertised a subset or entire set of these CSI-RS antenna ports depending on the mode of operation (e.g., CoMP, range expansion, etc.), its capabilities, and its path loss/channel conditions/distance from different transmission points etc.

The different ports may have different duty cycles. The CSI-RS pattern/virtual antenna created on a CSI-RS port seen by a UE may vary from subframe to subframe (e.g., when different periodicities and/or offsets of CSI-RS patterns are configured across different transmission points having the same cell ID). For legacy UEs the smallest common set of CSI-RS ports across different subframes may be indicated; for new UEs, the subframe-dependent CSI-RS ports can be signaled.

The transmissions of the legacy UEs that are not aware of any CSI-RS configuration are punctured in the CSI-RS locations of the macro eNodeB and the RRHs. Transmissions to UEs that are aware of one CSI-RS configuration but not aware of others are rate matched around the CSI-RS resource elements (REs) and muted REs known to the UE and punctured in non muted CSI-RS locations of other cells. To avoid puncturing, the muting pattern advertised to such UEs could include the CSI-RS locations of other cells of which the UE is not aware. Puncturing is not performed for UE-RS (reference signal) based transmissions that are sent from only one cell. For example, if only the RRH is transmitting UE-RS based data to the UE, the data can be transmitted by the RRH on resources where the macro cell is transmitting CSI-RS and no changes are made to the macro cell's transmissions.

Figure 7:
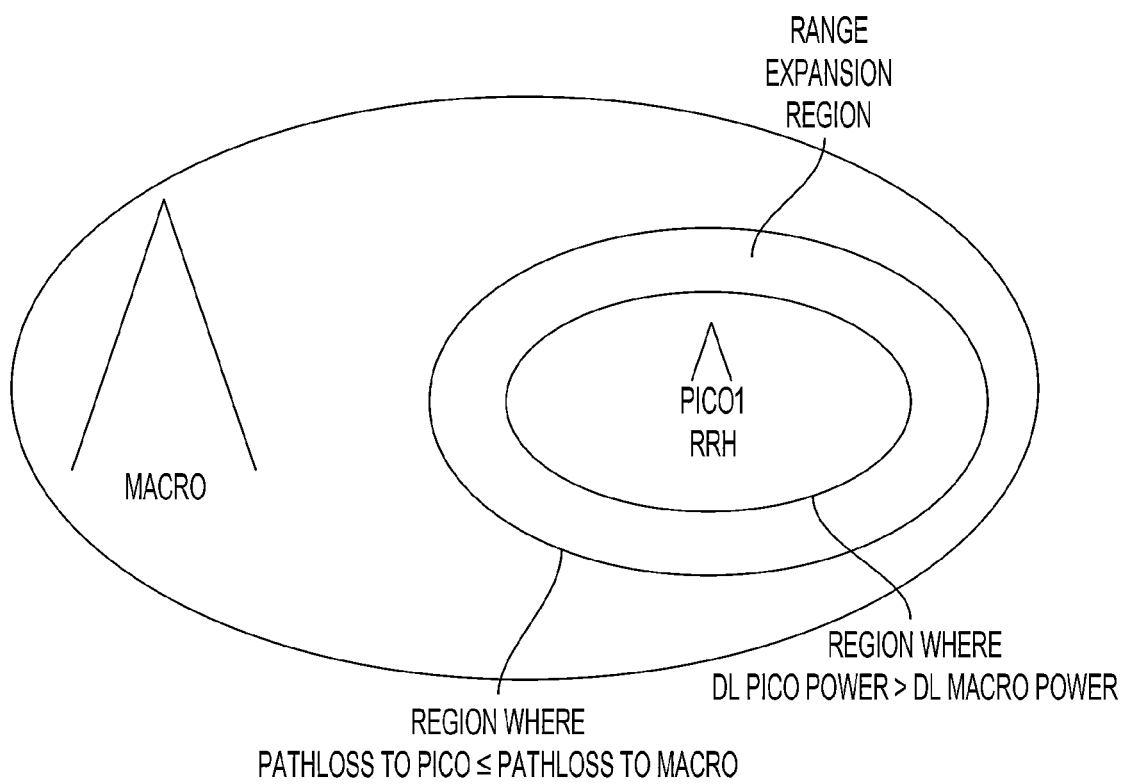
FIG. 7 illustrates data transmission in a range expansion region.

In another configuration, as illustrated in FIG. 7, the macro base station (i.e., macro eNodeB) mutes the CSI-RS resource elements (REs) of the RRH to enable range expansion for the RRH. The muting of CSI-RS of the macro eNodeB by a RRH may be implemented to prevent some rate matching issues. For example, when the CRS based transmissions are used for UEs in range expansion mode, the macro CSI-RS locations are not used for data transmissions. For the same UEs, if the UE-RS (user equipment-reference signal) based transmission is used (instead of CRS based transmission), and data is only transmitted from the RRH antennas, the CSI-RS locations of the macro may be used for data transmissions. In other words, different rate matching may be employed for CRS and UE-RS based transmission. Another solution may include using the CSI-RS resource elements of the macro cell for the UE-RS based data transmission by the RRH, but not scheduling the CRS based transmission for such UEs on subframes containing CSI-RS/muted REs from the macro cell.

The CSI-RS scrambling sequence is a function of the cell ID. To avoid the single frequency network (SFN) effect on CSI-RS when CSI-RS transmissions occur on the same resource for multiple transmission points, the CSI-RS of the macro eNodeB and all RRHs may be transmitted on different locations. The signal strength reduces with distance for RRHs that are far away, and it may be possible to use the same location for CSI-RS for RRHs that are far away from each other as the SFN impact on CSI-RS may not impact performance significantly. If enough locations are not available (i.e., the CSI-RSs have to be transmitted at the same location), different scrambling sequences can be allowed on the same location CSI-RSs for the same cell ID.

Initial Acquisition and Association

In Release 8 LTE systems, a UE identifies a base station by searching for synchronization signals from the base station which are a function of the cell ID. If all of the macro base stations and the RRHs have the same cell ID they transmit the same synchronization signal at the same location. From these synchronization signals it is not possible for the UE to identify the macro base station. Various configurations may be employed to assist the UE in identifying the macro cell and/or the RRHs.

In particular, the primary synchronization signal (PSS) and the secondary synchronization signal (SSS) may or may not be transmitted by the RRH. If the signals are transmitted, the UE will likely see one signal (PSS, SSS) which is a combination of the PSS and SSS sent by the RRH and the macro eNodeB. If the RRH has only one transmit (Tx) antenna and the eNodeB has one transmit (Tx) antenna or they both use the same beam/same phase for an antenna across time, then rotating the phase of PSS/SSS at the eNodeB and RRH antennas may improve searcher performance for stationary UEs by randomizing the effective PSS and SSS beams.

In one configuration, if the CRS is transmitted by the RRH, then physical broadcast channels (PBCHs) and system information blocks (SIBs) are also configured to be transmitted by the RRH. The content of the PBCH, SIB, etc, including the number of advertised antennas, is configured as common for all transmission points that are transmitting CRS (i.e., the same as the macro eNodeB). In one example, some may only transmit CRS for a fewer number of antenna ports while leaving CRS resource elements of other antenna ports blank.

In one configuration, to assist the UE in distinguishing between the RRHs, the RRH advertises itself using new signals and may signal in SIB, etc. Alternately, in another configuration for assisting the UE in identifying RRHs, the UE looks for the CSI-RS. In particular, if the CSI-RS of the macro and the RRH are on separate resources, the UE may be told to search for the RRH by looking for the CSI-RS at particular locations. Additionally, the eNodeB/RRH may assist the UE by indicating one or more of the locations, scrambling sequence, number of ports, periodicity, subframe offset, power level, and/other configuration information to enable search for CSI-RS of the RRH/other new identification signal etc.

The UE may use CSI-RS and/or new signals to identify the RRH and estimate path loss, etc., which can then be used by the UE and/or reported to the eNodeB to determine which station to connect to, and/or if the UE can be served using range expansion. The UE may use CSI-RS to detect the RRH and estimate path loss, signal strength to different RRHs. Thus, it may be beneficial to have the CSI-RS configuration include transmit power level of different CSI-RS ports, etc. either unicast to UEs that may use such information or broadcast to some or all UEs that use this information.

In another example, the eNodeB and RRH decide how the UE will be served (e.g., CRS/UE-RS transmission mode, range expansion, etc.) based on measurements of uplink channels such as the sounding reference signal (SRS) and based on the capability of the UE. Different RRHs and the macro eNodeB make uplink measurements for the same SRS. The measurements may be forwarded to the macro eNodeB. The UE is associated with the RRH/macro with the least path loss if it is a range expansion capable UE (for example if it can be served by using UE-RS based transmissions). Some transmissions to the UE (e.g., data) may be from the RRH while others may originate from the macro eNodeB only, or may originate from joint transmission of the macro eNodeB and the RRH, etc. Such transmissions include, e.g., control channels/SIBs/PBCH, etc.

Figures 8A, 8B:
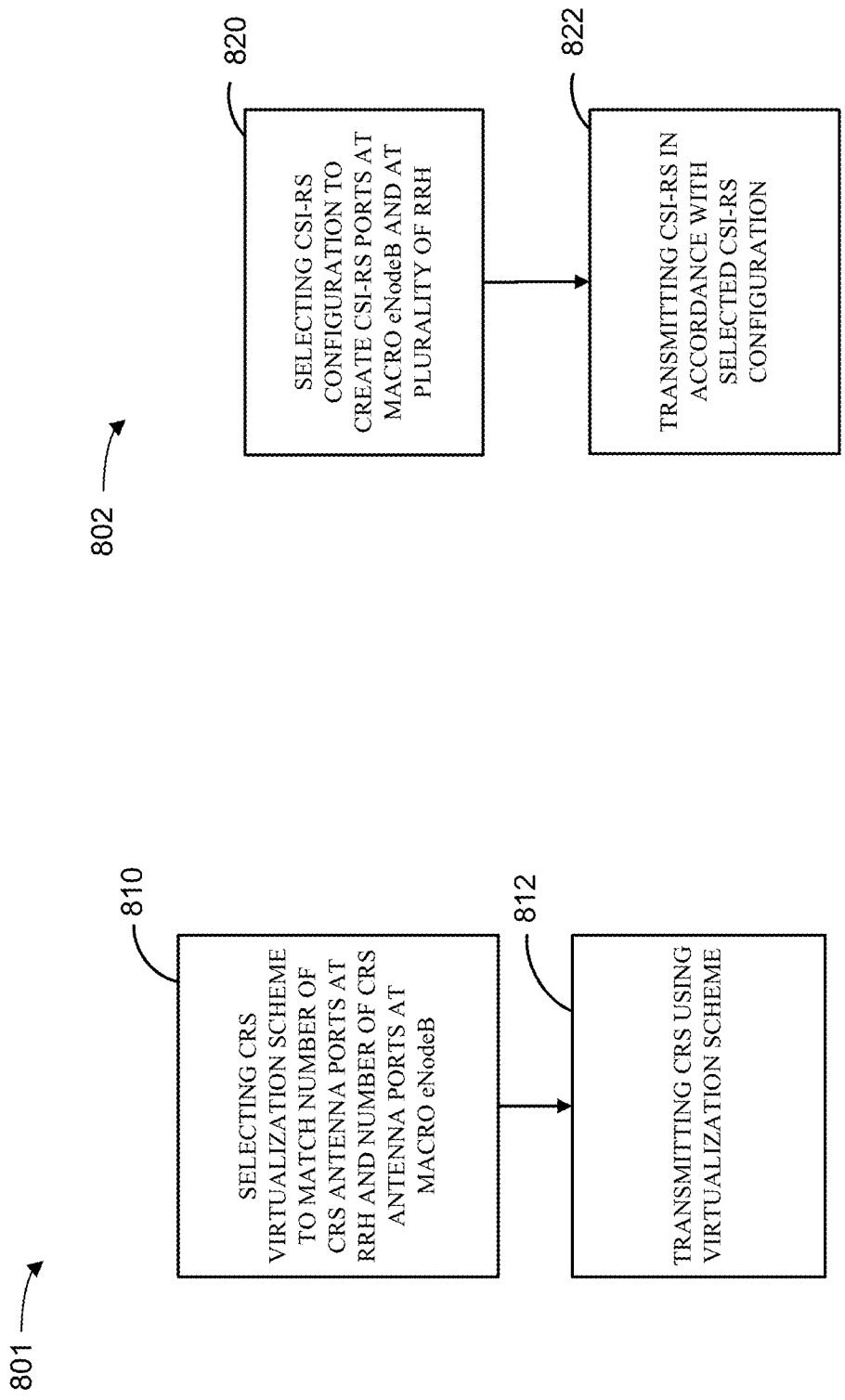
FIG. 8A is a block diagram illustrating a method for configuring CRS transmissions in a network having remote radio heads (RRHs).
FIG. 8B is a block diagram illustrating a method for configuring CSI-RS transmissions in a network having remote radio heads (RRHs).

FIGS. 8A-8D illustrate methods 801, 802, 803 and 804 related to remote radio head configurations. In particular, FIG. 8A illustrates a method 801 for configuring CRS transmissions in a network having remote radio heads (RRH). At block 810 a CRS virtualization scheme is selected. The virtualization scheme matches a number of CRS antenna ports at a RRH and a number of CRS antenna ports at the macro eNodeB. At block 812, CRS is transmitted using the selected virtualization scheme.

FIG. 8B illustrates a method 802 for configuring CSI-RS transmissions in a network having remote radio heads (RRH). At block 820, a channel state information reference signal (CSI-RS) configuration is selected. The CSI-RS configuration creates CSI-RS ports at a macro eNodeB and at a plurality of RRHs. At block 822, CSI-RS is transmitted in accordance with the selected CSI-RS configuration.

FIG. 8C illustrates a method 803 for associating with a remote radio head. At block 830 an RRH is identified by either explicit signaling or by locating CSI-RS signals associated with the RRH. At block 832, the UE determines whether to connect to the identified RRH.

FIG. 8D illustrates a method 8004 for configuring a network having remote radio heads (RRHs). At block 840, a macro eNodeB measure an uplink signal. At block 842, the macro eNodeB receives a measurement of the uplink signal from a remote radio head. At block 844, the macro eNodeB determines whether to serve the UE from the macro eNodeB or from the RRH based on the measurements.

In one configuration, the eNodeB 110 is configured for wireless communication including means for selecting. In one aspect, the selecting means may be the controller processor 440 and memory 442 configured to perform the functions recited by the selecting means. The eNodeB 110 is also configured to include a means for transmitting. In one aspect, the transmitting means may be the transmit processor 420, transmit MIMO processor 430, modulators 432a-t and/or antenna 434a-t configured to perform the functions recited by the transmitting means. In another aspect, the aforementioned means may be a module or any apparatus configured to perform the functions recited by the aforementioned means.

In one configuration, the UE 120 is configured for wireless communication including means for identifying. In one aspect, the identifying means may be the controller/processor 480 and the memory 482 configured to perform the functions recited by the identifying means. The UE 120 is also configured to include means for determining. In one aspect, the determining means may be the controller/processor 480 and the memory 482 configured to perform the functions recited by the determining means. In another aspect, the aforementioned means may be a module or any apparatus configured to perform the functions recited by the aforementioned means.

In one configuration, the eNodeB 110 is configured for wireless communication including means for measuring. In one aspect, the measuring means may be the controller processor 440 and memory 442 configured to perform the functions recited by the selecting means. The eNodeB 110 is also configured to include a means for receiving. The eNodeB 110 is also configured to include a means for determining. In one aspect, the receiving means may be the receive processor 438, transmit MIMO detector 436, demodulators 432*a-t*, controller/processor 430 and antenna 434*a-t* configured to perform the functions recited by the receiving means. The eNodeB 110 is also configured to include a means for determining. In one aspect, the determining means may be the controller/processor 440 and memory 442 configured to perform the functions recited by the serving means. In another aspect, the aforementioned means may be a module or any apparatus configured to perform the functions recited by the aforementioned means.

Figure 9:
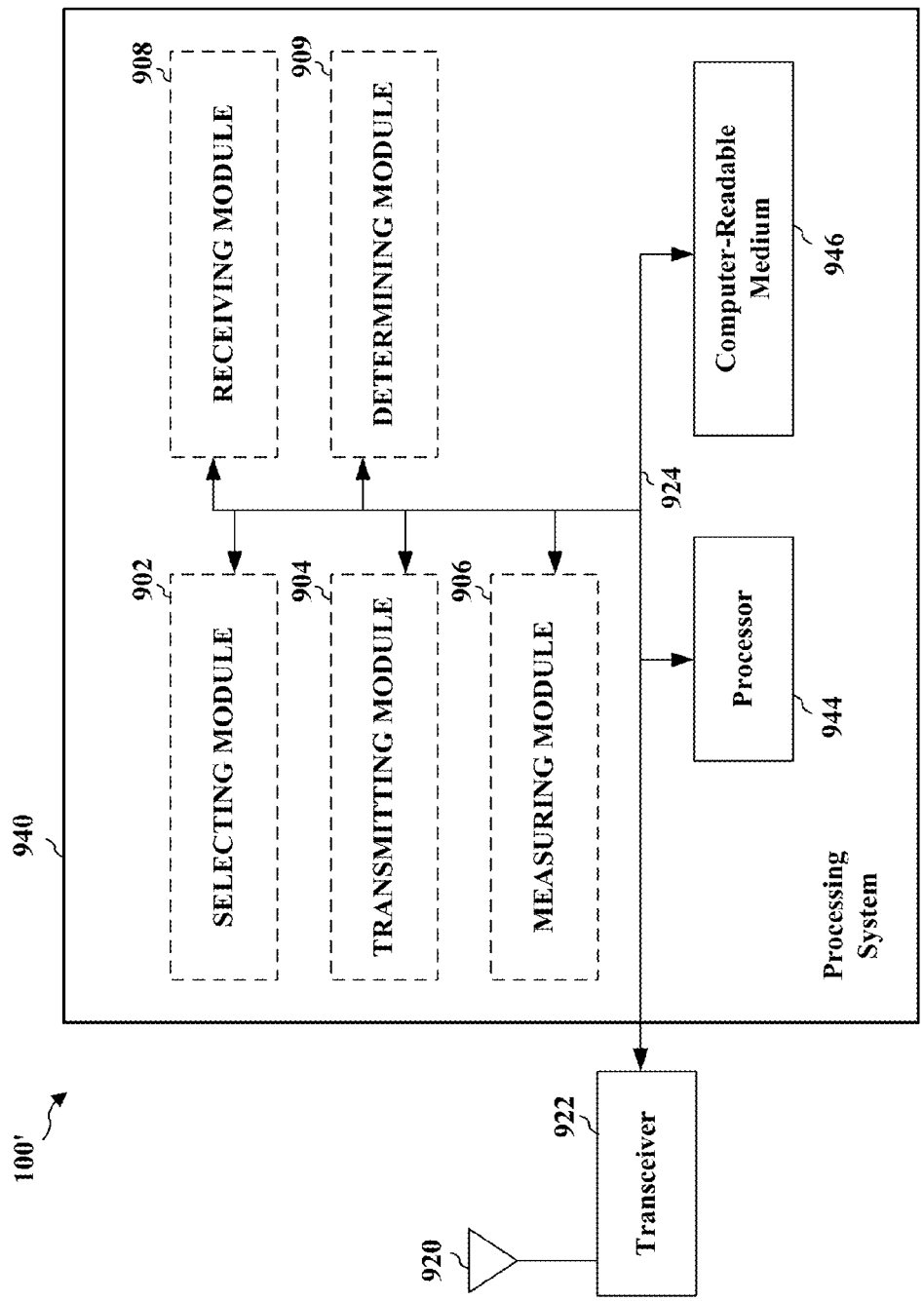
FIG. 9 is a block diagram illustrating an example of a hardware implementation for an apparatus employing a processing system.

FIG. 9 is a diagram illustrating an example of a hardware implementation for an apparatus 100' employing a processing system 940 for use by an eNodeB 110. The processing system 940 may be implemented with a bus architecture, represented generally by the bus 924. The bus 924 may include any number of interconnecting buses and bridges depending on the specific application of the processing system 940 and the overall design constraints. The bus 924 links together various circuits including one or more processors and/or hardware modules, represented by the processor 944, the modules 902, 904, 906, 908 and 909, and the computer-readable medium 946. The bus 924 may also link various other circuits such as timing sources, peripherals, voltage regulators, and power management circuits, which are well known in the art, and therefore, will not be described any further.

The apparatus includes a processing system 940 coupled to a transceiver 922. The transceiver 922 is coupled to one or more antennas 920. The transceiver 922 provides a means for communicating with various other apparatus over a transmission medium. The processing system 940 includes a processor 944 coupled to a computer-readable medium 946. The processor 944 is responsible for general processing, including the execution of software stored on the computer-readable medium 946. The software, when executed by the processor 944, causes the processing system 940 to perform the various functions described supra for any particular apparatus. The computer-readable medium 946 may also be used for storing data that is manipulated by the processor 944 when executing software. The processing system further includes modules 902, 904, 906, 908 and 909. The modules may be software modules running in the processor 944, resident/stored in the computer readable medium 946, one or more hardware modules coupled to the processor 944, or some combination thereof. The processing system 944 may be a component of the eNB 110 and may include the memory 442 and/or at least one of the TX processor 430, the RX processor 438, and the controller/processor 440.

Figure 10:
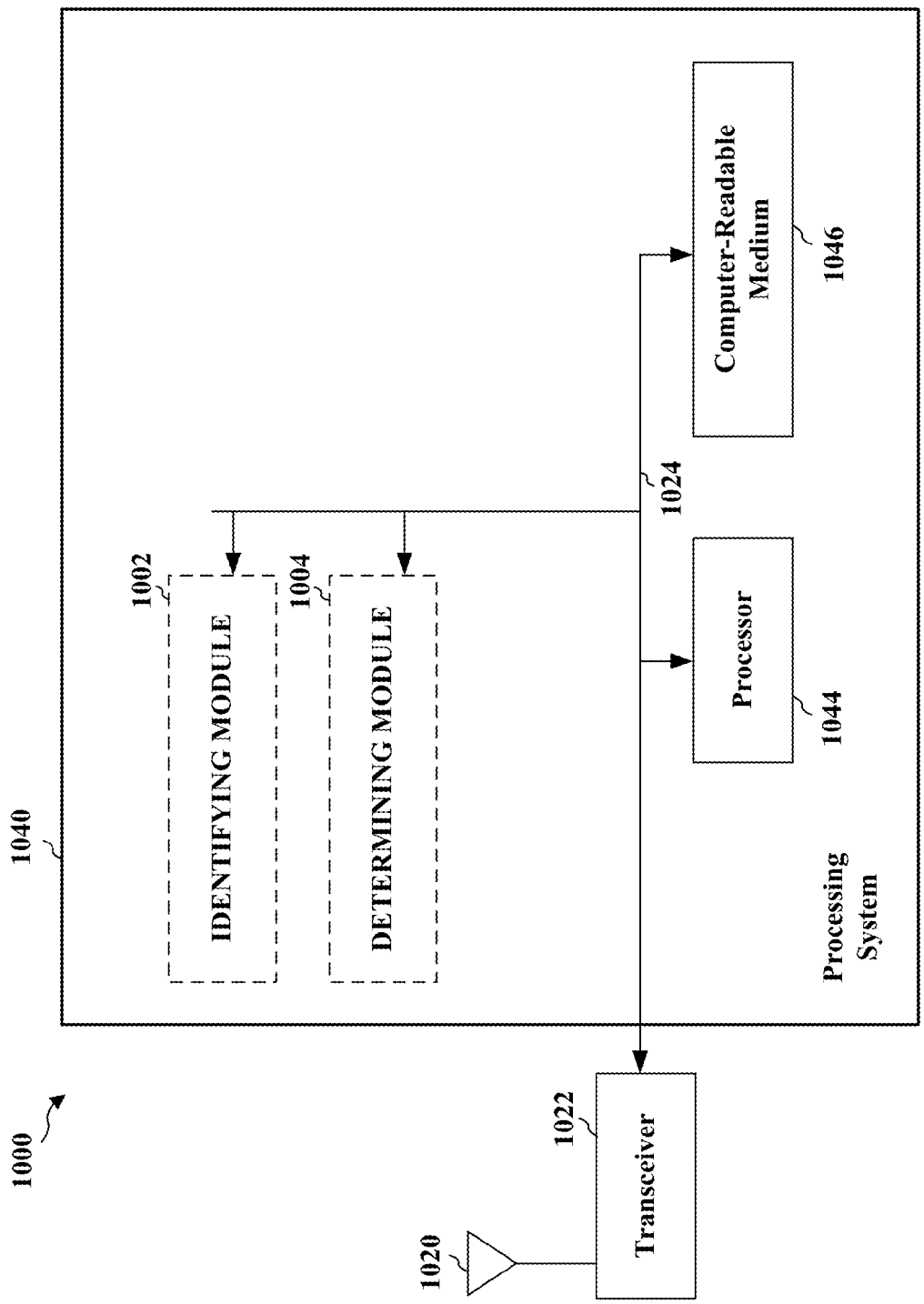
FIG. 10 is a block diagram illustrating an example of a hardware implementation for an apparatus employing a processing system.

FIG. 10 is a diagram illustrating an example of a hardware implementation for an apparatus 1000 employing a processing system 1040 used by a UE 120. The processing system 1040 may be implemented with a bus architecture, represented generally by the bus 1024. The bus 1024 may include any number of interconnecting buses and bridges depending on the specific application of the processing system 1040 and the overall design constraints. The bus 1024 links together various circuits including one or more processors and/or hardware modules, represented by the processor 1044, the modules 1002 and 1004, and the computer-readable medium 1046. The bus 1024 may also link various other circuits such as timing sources, peripherals, voltage regulators, and power management circuits, which are well known in the art, and therefore, will not be described any further.

The apparatus includes a processing system 1040 coupled to a transceiver 1022. The transceiver 1022 is coupled to one or more antennas 1020. The transceiver 1022 provides a means for communicating with various other apparatus over a transmission medium. The processing system 1040 includes a processor 1044 coupled to a computer-readable medium 1046. The processor 1044 is responsible for general processing, including the execution of software stored on the computer-readable medium 1046. The software, when executed by the processor 1044, causes the processing system 1040 to perform the various functions described supra for any particular apparatus. The computer-readable medium 1046 may also be used for storing data that is manipulated by the processor 1044 when executing software. The processing system further includes modules 1002 and 1004. The modules may be software modules running in the processor 1044, resident/stored in the computer readable medium 1046, one or more hardware modules coupled to the processor 1044, or some combination thereof. The processing system 1044 may be a component of the UE 120 and may include the memory 482 and/or at least one of the TX processor 464, the RX processor 458, and the controller/processor 480.

In one configuration, the apparatus 1000 for wireless communication includes means for identifying and means for determining. The aforementioned means may be one or more of the aforementioned modules of the apparatus 1000 and/or the processing system 1044 of the apparatus 1000 configured to perform the functions recited by the aforementioned means. As described supra, the processing system 1044 may include the TX Processor 464, the RX Processor 458, and the controller/processor 480.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   selecting, at an eNodeB, a common reference signal (CRS) virtualization scheme for at least one legacy user equipment (UE) that decodes data transmissions based at least in part on channel estimates obtained from a CRS; and
   transmitting, from the eNodeB to the at least one legacy UE, the CRS via at least one CRS antenna port based at least in part on the CRS virtualization scheme, the CRS transmissions using a same set of beams, a same time and frequency resource, a same CRS antenna port, and a same traffic-to-pilot (T2P) ratio as the data transmissions from the eNodeB to the at least one legacy UE when the at least one legacy UE decodes the data transmissions using a CRS based decoding scheme.

2. The method of claim 1, in which a remote radio head (RRH) has a same number of CRS antenna ports as the eNodeB.

3. The method of claim 1, in which CRS antenna ports of a remote radio head (RRH) are linearly independent from CRS antenna ports of the eNodeB.

4. The method of claim 1, further comprising selecting the CRS virtualization scheme that increases power boost of the transmitted CRS.

5. The method of claim 1, further comprising selecting the CRS virtualization scheme to improve SFBC (space frequency block code)/SFBC-FSTD (frequency shift transmit diversity) performance.

6. The method of claim 1, further comprising transmitting a signal, to the at least one legacy UE, to enable the at least one legacy UE to determine T2P ratio differences between CRS antenna ports.

7. The method of claim 1, in which the CRS transmissions use at least a different set of beams, a different time and frequency resource, a different CRS antenna port, a different traffic-to-pilot (T2P) ratio, or a combination thereof when the at least one legacy UE does not decode the data transmissions using the CRS based decoding scheme.

8. An eNodeB for wireless communication, comprising:
   a memory; and
   at least one processor coupled to the memory, the at least one processor being configured:
      to select a common reference signal (CRS) virtualization scheme for at least one legacy user equipment (UE) that decodes data transmissions based at least in part on channel estimates obtained from a CRS; and
      to transmit, to the at least one legacy UE, the CRS via at least one CRS antenna port based at least in part on the CRS virtualization scheme, the CRS transmissions using a same set of beams, a same time and frequency resource, a same CRS antenna port, and a same traffic-to-pilot (T2P) ratio as the data transmissions from the eNodeB to the at least one legacy UE when the at least one legacy UE decodes the data transmissions using a CRS based decoding scheme.

9. The eNodeB of claim 8, in which a remote radio head (RRH) has a same number of CRS antenna ports as the eNodeB.

10. The eNodeB of claim 8, in which CRS antenna ports of a remote radio head (RRH) are linearly independent from CRS antenna ports of the eNodeB.

11. The eNodeB of claim 8, in which the processor is further configured to select the CRS virtualization scheme that increases power boost of the transmitted CRS.

12. The eNodeB of claim 8, in which the processor is further configured to select the CRS virtualization scheme to improve SFBC (space frequency block code)/SFBC-FSTD (frequency shift transmit diversity) performance.

13. The eNodeB of claim 8, in which the processor is further configured to transmit a signal, to the at least one legacy UE, to enable the at least one legacy UE to determine T2P ratio differences between CRS antenna ports.

14. The eNodeB of claim 8, in which the CRS transmissions use at least a different set of beams, a different time and frequency resource, a different CRS antenna port, a different traffic-to-pilot (T2P) ratio, or a combination thereof when the at least one legacy UE does not decode the data transmissions using the CRS based decoding scheme.

15. A computer program product for wireless communication in a wireless network, comprising:
  a non-transitory computer-readable medium having non-transitory program code recorded thereon, the program code comprising:
    program code to select, at an eNodeB, a common reference signal (CRS) virtualization scheme for at least one legacy user equipment (UE) that decodes data transmissions based at least in part on channel estimates obtained from a CRS; and
    program code to transmit, from the eNodeB to the at least one legacy UE, the CRS via at least one CRS antenna port based at least in part on the CRS virtualization scheme, the CRS transmissions using a same set of beams, a same time and frequency resource, a same CRS antenna port, and a same traffic-to-pilot (T2P) ratio as the data transmissions from the eNodeB to the at least one legacy UE when the at least one legacy UE decodes the data transmissions using a CRS based decoding scheme.

16. The computer program product of claim 15, in which the CRS transmissions use at least a different set of beams, a different time and frequency resource, a different CRS antenna port, a different traffic-to-pilot (T2P) ratio, or a combination thereof when the at least one legacy UE does not decode the data transmissions using the CRS based decoding scheme.

17. An apparatus for wireless communication, comprising:
  means for selecting, at an eNodeB, a common reference signal (CRS) virtualization scheme for at least one legacy user equipment (UE) that decodes data transmissions based at least in part on channel estimates obtained from a CRS; and
  means for transmitting, from the eNodeB to the at least one legacy UE, the CRS via at least one CRS antenna port based at least in part on the CRS virtualization scheme, the CRS transmissions using a same set of beams, a same time and frequency resource, a same CRS antenna port, and a same traffic-to-pilot (T2P) ratio as the data transmissions from the eNodeB to the at least one legacy UE when the at least one legacy UE decodes the data transmissions using a CRS based decoding scheme.

18. The apparatus of claim 17, in which the CRS transmissions use at least a different set of beams, a different time and frequency resource, a different CRS antenna port, a different traffic-to-pilot (T2P) ratio, or a combination thereof when the at least one legacy UE does not decode the data transmissions using the CRS based decoding scheme.

* * * * *